United States Patent [19]

van der Werf et al.

[11] Patent Number: 4,665,444
[45] Date of Patent: May 12, 1987

[54] CIRCUIT FOR REPRODUCING VIDEO SIGNALS

[75] Inventors: Haye J. J. van der Werf; Johannes T. Kanters, both of Eindhoven, Netherlands

[73] Assignee: U.S. Philips Corporation, New York, N.Y.

[21] Appl. No.: 658,927

[22] Filed: Oct. 9, 1984

[30] Foreign Application Priority Data

Oct. 17, 1983 [NL] Netherlands ................. 8303567

[51] Int. Cl.$^4$ ............................................ H04N 5/94
[52] U.S. Cl. .................................. 360/38.1; 360/32; 358/336
[58] Field of Search ............... 360/38.1, 32, 33.1; 358/336, 314, 335

[56] References Cited

U.S. PATENT DOCUMENTS

| 3,947,873 | 3/1976 | Buchan | 360/38.1 |
| 4,158,855 | 6/1979 | Thomas | 358/336 |
| 4,199,780 | 4/1980 | Taylor | 358/314 |
| 4,409,627 | 10/1983 | Eto | 360/38.1 |
| 4,481,644 | 11/1984 | Peters | 358/135 |

FOREIGN PATENT DOCUMENTS 16610  2/1978  Japan .................. 360/38.1

Primary Examiner—Alan Faber
Attorney, Agent, or Firm—William J. Streeter; Edward W. Goodman; Anne E. Barschall

[57] ABSTRACT

A digital magnetic tape video recorder with dropout compensation; to prevent delays in the demodulation of the digital video signal after a dropout has ended, owing to the fact that the channel clock is free-running, signal insertion during such a dropout is continued after that dropout has ended up to the next synchronizing word for dropouts having a duration exceeding a predetermined length of time.

3 Claims, 1 Drawing Figure

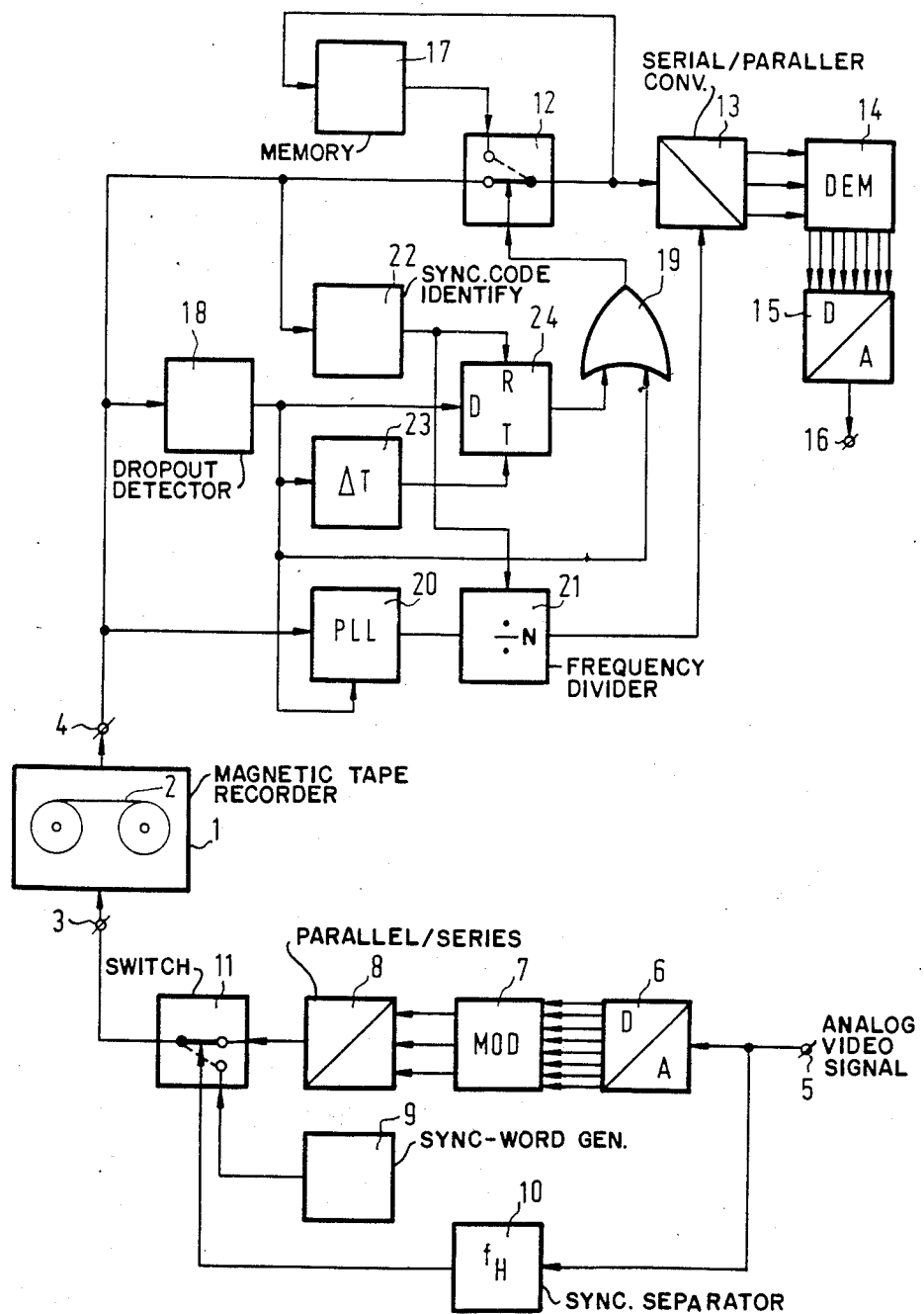

CIRCUIT FOR REPRODUCING VIDEO SIGNALS

The invention relates to an circuit for reproducing video information with the aid of a transmission means. The video information is avialable at an output through that transmission means as a serial bit sequence comprising at least one synchronizing word in each video line. The circuit has:
- a dropout detector for detecting the loss of bits from the bit sequence at that output and generating a signal for the duration of the dropout,
- a channel clock circuit for generating a clock signal which is coupled to the bit frequency of the above serial bit sequence,
- a digital signal processing circuit for processing the serial bits under the control of that clock signal,
- a synchronizing word-identification circuit for recognizing a synchronizing word in that serial bit stream and synchronizing the signal processing circuit therewith,
- a memory having a capacity which is at least equal to the number of bits displayed during one line period of the video signal for continuously storing the information displayed during at least a corresponding line period preceding the current moment, and
- switching means for connecting the digital signal processing unit to an output of the memory circuit under the control of the dropout detector.

Such an circuit can be used for recording and reproducing video signals from a magnetic tape in digitized form, but also for other purposes such as receiving such signals via a transmission cable. To that end, on recording, the analog vidoe signal is converted into groups of bits which, after having been suitably encoded in a manner as, for example, described in the Netherlands patent application No. 8,105,196 corresponding to U.S. Pat. No. 4,481,644, issued Nov. 6, 1984, are recorded on the tape as a serial bit sequence. After having been read, said bits are regrouped and decoded under the control of the clock signal. To limit picture distortion due to dropouts, it is possible with video signals to insert a corresponding portion of the preceding line or a corresponding line from a previous field during such a dropout. In the case of digital recording, it has been found that this results sometimes in more serious distortions.

The invention has for its object to provide an circuit of the type set forth in the opening paragraph in which inserting a portion of the preceding line does not result in more serious distortions. To that end, the invention provides a hold circuit for holding the switching means in the position in which the digital signal processing unit is connected to the output of the memory circuit up to the occurrence of a synchronizing word in the reproduced serial bit stream when the dropout detected by the dropout detector exceeds a predetermined period of time.

In accordance with the discovery on which the invention is based, the deterioration of the picture quality is caused by the fact that during dropouts of a longer duration, not the same number of bits as have disappeared owing to the dropout are inserted by the memory circuit. This results because the channel clock is free running during a dropout. As a result thereof, regrouping the serial bit sequence is not effected in conformity with grouping of those bits before recording, so that after the dropout has ended no adequate signal can be formed anymore by the signal processing circuit up to the moment at which a synchronizing word appears. This problem does not occur when insertion of the preceding line is continued until a synchronizing word occurs in the event of dropouts which exceed a predetermined period of time.

An embodiment of the invention may have the hold circuit comprising a bistable circuit which is set by the dropout detector after said predetermined period of time and is reset by the synchronizing word identification circuit.

This embodiment may futher have the bistable circuit as a clocked flip-flop to whose setting input the output signal of the dropout detector is applied, to whose clock input a signal is applied which is delayed with respect to the output signal of that dropout detector, and to whose resetting input an output signal of the synchronizing word identification circuit is applied.

DESCRIPTION OF THE FIGURE

The invention will now be described in greater detail, by way of example, with reference to the accompanying drawing which illustrates an arrangement according to the invention.

DESCRIPTION OF THE PREFERRED EMBODIMENT

The sole FIGURE shows an circuit according to the invention. It comprises a magnetic tape recorder 1 in which a magnetic tape 2 is present. When the magnetic tape recorder is switched-on in the recording mode, the signal present at an input 3 is recorded. In the reproducing mode the signal reproduced from the magnetic tape 2 appears at an output 4.

For the purpose of recording video signals an input 5 for receiving the analog video signal to be recorded is provided. This analog video signal is converted into, in this example, an 8-bit code with the aid of an analog-to-digital converter 6. These 8 bits are applied in parallel to a modulator circuit 7, which converts those 8 bits in parallel into n-bit parallel code words, in accordance with a suitable encoding system. A modulator circuit which is very suitable for this purpose is described in the Netherlands patent application No. 8,105,196 in which n-bit code words are formed in accordance with certain rules. With the aid of a parallel-to-series converter 8 those n-bit code words are converted into a one-bit signal, which is applied to the input 3 of the magnetic tape recorder 1 through a switch 11.

Partly for the purpose of reconverting the serial bit stream again into the parallel code words on reproducing synchronizing words are added to the video signal at the beginning of each line. To that end, using a sync-separator 10, the line synchronizing pulses are spearated from the analog video signal at input 5 and switch 11 is operated therewith. At the beginning of each line, switch 11 connects the input 3 of the magnetic tape recorder 1 to a synchronizing-word generator 9, as a result of which such a synchronizing word is present in the recorded signal at the beginning of each line.

For the purpose of reproducing the recorded video signal, the serial bit stream appearing at the output 4 of the magnetic tape recorder is converted with the aid of a series-to-parallel converter 13 into n-bit parallel words which, in this example are converted to 8-bit words by means of a demodulator circuit 14 which is complementary to the modulator circuit 7. A suitable embodiment of such a demodulator circuit 14 is described in the said Netherlands patent application No. 8,105,196. Thereafter the 8-bit words are converted with the aid of a digital-to-analog converter 15 into an analog video signal which becomes available at the output 16.

To ensure that the correct group of bits from the serial bit stream are converted into n-bit code words with the aid of the series-to-parallel converter 13 the converter is controlled by a conversion synchronizing signal produced by a frequency divider 21, which divides a channel clock signal received from a phase-locked loop 20 by a factor of n. The phase-locked loop 20 is locked onto the serial bit stream coming from output 4, so that a signal is applied to divider 21 in synchronism with the bit frequency of the serial bit stream. Thus, the divider 21 counts groups of n bits wherein n may even be a variable quantity. So as to provide that the divider 21 controls the converter 13 such that the correct n bits are combined to form a parallel word, a synchronizing-code word identification circuit 22 which, for example continuously, compares the serial bit stream appearing at an output 4 with a reference code wore. The counter 21 is synchronized by, for example, adjusting it to a predetermined counting position under the control of the synchronizing word identification circuit 22.

Particularly when the digitized video signals are magnetically recorded there is the risk that, for example due to imperfections in or on the magnetic tape, one or more bits are not read. Erroneously reading one single bit can usually be corrected by means of error correction in, for example, the demodulator circuit 14. Large groups of missing bits often can not be corrected. In the event of video recording the picture distortion caused by such an interference can often be limited by utilizing the fact that consecutive lines of a video picture are often highly similar. The picture distortion can then be limited by inserting a corresponding portion of a previous line or even a previous field during such a dropout. For that purpose the circuit includes a dropout detector 18 which produces a pulse during the period no signal is present at output 4. With the aid of that dropout detector 18 a switch 12, which connects the input of the series-to-parallel converter 13 to the output of a memory circuit 17 instead of to the output 4, is operated by a gate 19. In the absence of dropouts the input of memory circuit 17 is connected to the output 4 via the switch 12. As memory circuit 17 has a storage capacity equal to one line period, the signal of the preceding period equal to the line period is always present in the memory circuit 17, so that during a dropout the corresponding portion of the preceding line is inserted.

A problem occurring in the case of dropouts is the fact that during such a dropout the phase-locked loop 20 does not receive an input signal and is free-running, because of which the output frequency is no longer reliable. During such a dropout series-to-parallel converter 13 is also controlled under the control of the clock signal by divider 21. The bits coming from memory circuit 17 are then also correctly grouped in n-bit words. Problems arise when at the end of the dropout the phase-locked loop 20 has got so far out of step with the rate at which the bits should have appeared at output 14 when no dropout were present, that converter 13 no longer correctly groups the bits into n-bit words. The n-bit words contain bits from two consecutive n-bit words which were converted during recording by the parallel-to-series converter 8, so that ultimately the analog video signal appearing at output 16 is completely distorted from the end of the dropout. A solution for this problem is not to reset the switch 12 after a dropout of such a duration that there is a risk the above-mentioned problem may occur, but to keep this switch connected to memory circuit 17 until the occurence of a synchronizing-code word, as divider 21 is adjusted to a correct counting position in response thereto. To that end a D-flip-flop 24 is provided to whose D-input the output signal of the dropout detector 18 is applied, and to whose clock input T the output signal of detector 18 is applied after having been delayed for a time T by delay network 23. Delay network 23 may, for example, be constituted by a multivibrator. Consequently flip-flop 24 is only set when the pulse at the output of detector 18 has a duration longer than $\Delta T$, correspong to dropouts exceeding the time $\Delta T$. The output singal of the flip-flop 24 is added to the output signal of the detector 18 by means of OR-gate 19. As a result thereof, at the instant a dropout occurs, switch 12 is connected to the output of the memory circuit 17 directly through gate 19 and when the dropout has a duration longer than $\Delta T$ remains in that position because of the fact flip-flop 24 is set. Flip-flop 24 has its resetting input R connected to the synchronizing-code word-identification circuit 22, so that switch 12 remains in that position until the occurrence of the next synchronizing code word. The result is that the above-mentioned problems do not occur and that the effect of a long dropout can only manifest itself at the end of a line because, owing to leading or lagging of the clock signals some bits disappear or a gap occurs which is hardly a problem since this occurs during the line retrace period.

In the circuit shown a connection has been made between the output of the dropout detector 18 and the phase-locked loop 20 so the voltage-controlled oscillator present in that loop receives a reference voltage during a dropout so that the time $\Delta T$ can be chosen to be longer than would be the case when that oscillator were fully free-running.

What is claimed is:

1. A circuit for reproducing video information with the aid of a transmission means, the video information becoming available at an output as a serial bit sequence comprising at least one synchronizing word in each video line, comprising
    a dropout detector for detecting the loss of bits from the bit sequence at said output and generating a signal for the duration of the dropout;
    a hold circuit for providing a switching signal equal to the duration of one line period when said loss of bits occurs for a time greater than a predetermined period of time;
    a channel clock circuit for generating a clock signal which is locked to the bit frequency of the serial bit sequence;
    a digital signal processing circuit for processing the serial bits under the control of said clock signal;
    a synchronizing word-identification circuit for recognizing a synchronizing word in said serial bit stream and synchronizing the signal processing circuit therewith;
    a memory having a capacity which is at least equal to the number of bits reproduced during one line period of the video signal for continuously storing the information reproduced during a corresponding line period preceding the current moment; and
    switching means for connecting the digital signal processing unit to an output of the memory circuit under the control of the switching signal, said hold circuit holding the switching means in the position in which the digital signal processing unit is connected to the output of the memory circuit up to the occurrence of a synchronizing word in the reproduced serial bit stream when the dropout detected by the dropout detector has a duration exceeding said predetermined period of time.

2. A circuit as claimed in claim 1, wherein the hold circuit comprises a bistable circuit which is set by the dropout detector after said predetermined period of time and is reset by the synchronizing word-identification circuit.

3. A circuit as claimed in claim 2, wherein the bistable circuit is a clocked flip-flop whose setting input receives the output signal of the dropout detector, receiving on a clock input a signal which is delayed with respect to the output signal of said dropout detector, and receives on a resetting input an output signal of the synchronizing-word identification circuit.

* * * * *